United States Patent
Wiedemann

(10) Patent No.: US 10,118,768 B2
(45) Date of Patent: Nov. 6, 2018

(54) SEWER CLEANING DEVICE AND/OR STREET CLEANING DEVICE

(71) Applicant: Karl Wiedemann, Welden (DE)

(72) Inventor: Karl Wiedemann, Welden (DE)

(*) Notice: Subject to any disclaimer, the term of this patent is extended or adjusted under 35 U.S.C. 154(b) by 0 days.

(21) Appl. No.: 15/838,795

(22) Filed: Dec. 12, 2017

(65) Prior Publication Data

US 2018/0178986 A1    Jun. 28, 2018

(30) Foreign Application Priority Data

Dec. 22, 2016 (DE) .................. 10 2016 015 407

(51) Int. Cl.
| | |
|---|---|
| *B65G 33/18* | (2006.01) |
| *E03F 7/10* | (2006.01) |
| *B65G 65/46* | (2006.01) |
| *E03F 9/00* | (2006.01) |

(52) U.S. Cl.
CPC .......... *B65G 33/18* (2013.01); *B65G 65/466* (2013.01); *E03F 7/10* (2013.01); *E03F 9/00* (2013.01)

(58) Field of Classification Search
CPC ...... B65G 47/18; B65G 65/46; B65G 65/466; B65G 33/08; B65G 33/18; B60P 1/40; E03F 7/10; E03F 9/00; G65G 33/10
USPC ....... 414/305, 306, 310, 325, 326, 505, 503, 414/526
See application file for complete search history.

(56) References Cited

U.S. PATENT DOCUMENTS

| | | | | |
|---|---|---|---|---|
| 1,831,648 | A * | 11/1931 | Bauer | B65F 3/22 414/468 |
| 3,259,261 | A * | 7/1966 | Gallagher | B28C 5/4286 198/657 |
| 3,647,094 | A * | 3/1972 | Jackson | A01F 25/2018 198/510.1 |
| 3,717,272 | A * | 2/1973 | Chartier | A01C 15/003 198/313 |

(Continued)

FOREIGN PATENT DOCUMENTS

| | | |
|---|---|---|
| DE | 222585 C | 4/1909 |
| DE | 88 458 A | 3/1972 |

(Continued)

*Primary Examiner* — Mark C Hageman
(74) *Attorney, Agent, or Firm* — Ewers & Hasselmann PLLC

(57) ABSTRACT

A sewer cleaning device and/or street cleaning device includes a dirt removal container for receiving and transporting mineral dirt residues accumulating during sewer and/or street cleaning. A removal device for clearing out the dirt removal container includes a conveying worm arrangement received on a swivel frame which is swivel-mounted on an axis extending in a longitudinal direction of the container and swivellable by a swivel drive. The conveying worm arrangement is sideways deflectable by the swivel frame relative to a center position associated with the container bottom on both sides along the container wall and a fast discharge of the dirt removal container can be achieved by two conveying worms arranged in symmetrical position relative to a central longitudinal axis of the swivel frame, the conveying worms limiting a gap therebetween and acting together for the transport of the bulk material along the inner side of the container wall.

14 Claims, 1 Drawing Sheet

(56) References Cited

U.S. PATENT DOCUMENTS

| | | | |
|---|---|---|---|
| 3,750,807 A * | 8/1973 | Jackson | A01F 25/2018 414/808 |
| 6,050,456 A * | 4/2000 | Soper | B65B 1/12 222/272 |
| 6,422,376 B1 * | 7/2002 | Nichols | B65G 33/32 198/632 |
| 6,948,902 B2 * | 9/2005 | Hanig | B65G 33/32 198/518 |
| 9,415,945 B1 * | 8/2016 | Whitney | B65G 45/005 |
| 2016/0311624 A1 | 10/2016 | Wiedemann | |

FOREIGN PATENT DOCUMENTS

| | | |
|---|---|---|
| DE | 195 38 846 A1 | 4/1997 |
| DE | 102014003018 A1 | 9/2015 |

* cited by examiner

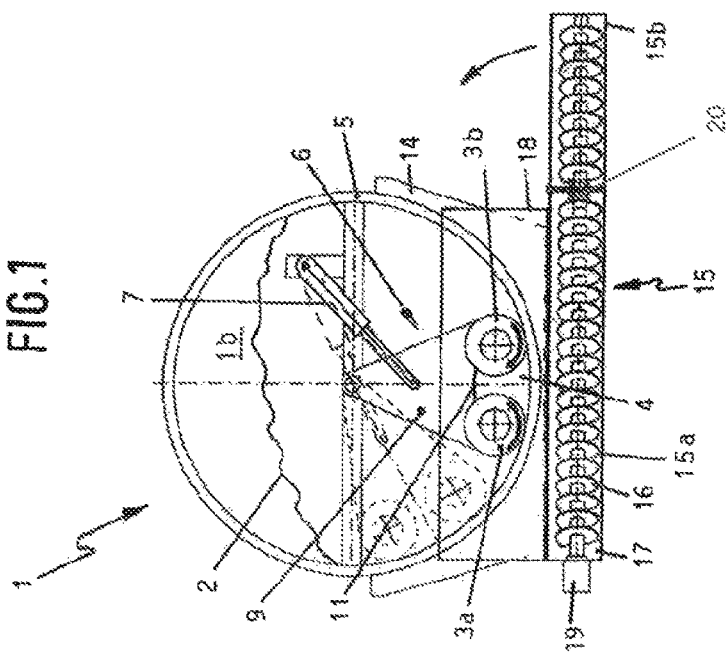
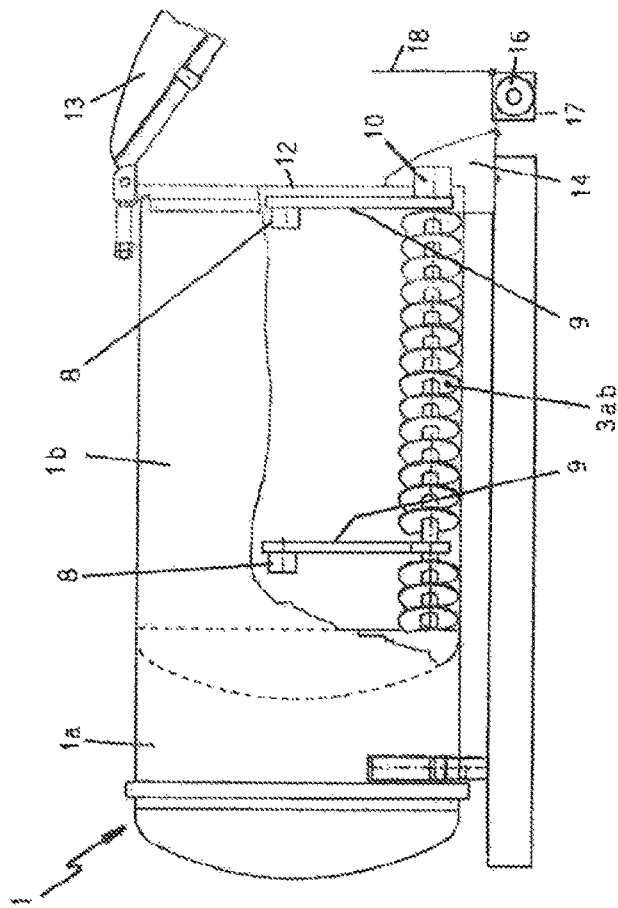

SEWER CLEANING DEVICE AND/OR STREET CLEANING DEVICE

CROSS REFERENCE TO RELATED APPLICATIONS

This application claims priority to German patent application DE 10 2016 015 407.1, filed Dec. 22, 2016, the entire content of which is incorporated herein by reference.

TECHNICAL FIELD

This invention relates to a sewer cleaning device and/or street cleaning device comprising at least one barrel shaped dirt removal container (1b) for receiving and transporting mineral dirt residues accumulating during sewer and/or street cleaning with a removal device being provided for clearing out the dirt removal container (1b) and associated with the latter, such dirt removal container (1b) being provided with a conveying worm arrangement extending in a longitudinal direction of the dirt removal container (1b) and provided with a rotary drive device, such conveying worm arrangement being received on a swivel frame (6) which is swivel-mounted on an axis extending in a longitudinal direction of the container and swivellable by means of a swivel drive (7), by means of such swivel frame (6) the conveying worm arrangement being sideways deflectable relative to a centre position associated with the container bottom on both sides along the container wall (5).

BACKGROUND

A device of this kind is known from United States Patent Application Publication No. 2016/0311624. In this known arrangement, the removal device comprises at least one conveying worm, with each conveying worm working individually. In particular in the case of grainy material, however, it may occur that the material taken up by the conveying worm during the upward movement of the swivel frame receiving the conveying worm at least partially falls through the gap between the individual volutions and that such material at least partially dodges during the subsequent return swivelling movement of the swivel frame of the conveying worm received by the latter. A discharge process for entirely discharging the dirt removal container may thus be rather time-consuming. The known removal device, therefore, does not operate sufficiently efficient.

SUMMARY

It is an object of the present invention to improve a device as described initially above in such a way that efficient functioning of the removal device and thus a comparatively fast discharge of the dirt removal container is assured by using simple and cost saving means.

According to an aspect of the invention, the object is achieved in that in a sewer cleaning device and/or street cleaning device as described above the conveying worm arrangement of the dirt removal device is provided with two conveying worms in symmetrical position relative to a central longitudinal axis of the swivel frame received thereon, such conveying worms limiting a gap therebetween and acting together for the transport of the bulk material along the inner side of the container wall.

By these measures, it is assured that during the upward swivel movement of the swivel frame the material falling through the front conveying worm in the swivel direction is taken up by the subsequent second conveying worm and retained by the gap limited by the two conveying worms where it is transported by the two conveying worms acting together along the container inside wall limiting the gap in a radial direction. Due to the symmetrical arrangement of the conveying worms laterally limiting the gap, this applies in an advantageous manner to both swivel directions of the swivel frame and thus to both sides of the dirt removal container, so that a comparatively fast and complete discharge of the dirt removal container is achieved, thus reducing idle times of the entire device during discharge and increasing its economic efficiency.

Advantageously, the two conveying worms received on the swivel frame may be spiraled in opposite directions and be drivable in opposite directions facing each other in the region of the container wall. It is thus ensured that both conveying worms laterally limiting a gap convey material into the gap in any position of the swivel frame in the region of the container wall radially limiting the gap, thus strongly supporting each other, so that a particularly high degree of efficiency is to be expected.

According to another aspect of the invention, the swivel frame receiving the two conveying worms may be deflectable relative to its center position by an angle which is smaller than 90 degrees, preferably reduced relative to the 90-degree position by at least half of the angle offset of the two conveying worms on the swivel frame. This ensures that in both swivel directions of the swivel frame the front conveying worm in the swivel direction is raised to approximately medium height of the dirt removal container, so that a reliable removal is effected in the region of the bottom cross section half of the container interior narrowing in downward direction while a bridging of material is reliably prevented, so that the material can slide from the top cross section half of the container interior, broadening downwards, whereby a reliable removal is effected.

A further advantageous measure may consist in the swivel frame comprising two parallel end shields, spaced from each other in the longitudinal direction of the conveying worms, swivellable about an axis extending in the longitudinal direction of the container, expediently corresponding to the central longitudinal axis of the container, such end shields having a form broadening towards the container wall and on which are arranged the two conveying worms at a distance forming the gap. Thus, a compact design is achieved. In order to prevent a sagging of the conveying worms, the distance between the two end shields may be smaller than the length of the conveying worms received thereon.

According to another aspect of the invention, the dirt removal container, in the region of its rear end, may be provided with an opening which can be closed by means of a swivel cover, such opening being associated with a tipping shield arranged underneath the container end and laterally flanking it, which may be preferably designed as a slide. Owing to the tipping shield, the material is expediently conveyed out of the dirt removal container in a purposeful manner, so that no soiling of the environment occurs.

According to a further aspect of the invention, measures downstream of the conveying worms received on the swivel frame a discharge worm arrangement may be arranged transversely thereto which expediently comprises a worm moving in a trough adjacent to the end of the dirt removal container which can be closed by means of a swivel cover and is expediently associated with the tipping shield. It is thus ensured that the bulk material conveyed out of the dirt removal container towards the rear is transported sideways and fed into a container or similar beside the sewer cleaning device and/or street cleaning device.

Advantageously, a foldable protection shield, associated with the lateral wall, may advantageously be provided for raising the height of the lateral wall of the trough away from the dirt removal container. The protection shield reliably prevents the bulk material conveyed out of the dirt removal container to the rear from being dumped beyond the trough and ensures that it reliably lands in the trough to be transported away by the worm associated with the latter.

BRIEF DESCRIPTION OF THE DRAWINGS

The invention will now be described with reference to the drawings wherein:

FIG. 1 shows a cross section of the rear part of a dirt removal container of a sewer cleaning vehicle; and FIG. 2 shows a longitudinal section of the arrangement according to FIG. 1.

DESCRIPTION OF EXEMPLARY EMBODIMENTS

The present invention is mainly used for sewer cleaning vehicles and/or street cleaning vehicles comprising a dirt removal container. The principle structure and method of operation of arrangements of this kind are known in the art. For this reason, mainly the particularities of the invention will be described in detail.

The barrel as described in FIGS. 1 and 2 is part of the structure of a sewer and/or street cleaning vehicle not shown in detail. In the example shown, the barrel 1 having a circular cross section is subdivided into a front water container 1a and a rear dirt removal container 1b. In order to simplify the illustrations, the suction, pumping and evacuating devices as well as the appertaining vehicle associated are not depicted.

The mineral components of the dirt dumped into the dirt removal container 1b deposit, thus accumulating to form a filling 2, which will increase over time, as indicated in FIG. 1 by an uneven surface. To remove the filling from the dirt removal container 1b, that is to say to empty the dirt removal container 1b, provision is made for a removal device installed in the dirt removal container 1b by means of which the material building the filling 2 can be transported out of the dirt removal container 1b.

The said removal device comprises, as can best be seen in FIG. 1 two conveying worms 3a, 3b, arranged parallel to each other, extending in the longitudinal direction of the container, which enclose between themselves a gap 4 parallel to the said conveying worms 3a, 3b and laterally limiting it, such gap 4 being limited by the internal side of the container wall 5 in a direction radially extending towards the outside. The conveying worms 3a, 3b laterally limiting the gap 4 are drivable jointly or, expediently, individually. In order to achieve good cooperation of the conveying worms 3a, 3b with regard to the removal of the bulk material in the gap 4, the two conveying worms 3a, 3b are spiralled in opposite direction, as indicated by turning arrows, and are drivable in opposite directions facing each other in the region of the container wall 5.

The conveying worms 3a, 3b laterally limiting the gap 4 are arranged in parallel positions next to each other on a swivel-mounted swivel frame 6 arranged about an axis extending in the longitudinal direction of the dirt removal container 1b, in this case the container central longitudinal axis, which is deflectable to both sides by means of a swivel device 7, as indicated in FIG. 1, relative to a center position associated with the container bottom, indicated in FIG. 1 by continuous lines, so that the front conveying worm 3a or 3b is lifted in the deflection direction to the middle height of the associated barrel shaped dirt removal container 1b. The deflection on both sides of the swivel frame 6 relative to the center position indicated in FIG. 1 by continuous lines is thus smaller than 90 degrees, in the example shown one half the size of the mutual angle offset of the two conveying worms 3a, 3b on the swivel frame 6 smaller than 90 degrees.

The swivel frame 6 comprises, as can best be seen in FIG. 2, two end shields 9 on an associated cross bar 8 installed in the dirt removal container 1b, which are swivel-mounted about the above described container central longitudinal axis, which are spaced from each other in the longitudinal direction of the associated conveying worms 3a, 3b. The end shields 9 possess, as shown in FIG. 1, a form which is broadening towards the container wall 5, so that the two conveying worms 3a, 3b with the distance associated with the gap 4 are receivable on the said end shields 9. By activating the swivel device 7 the swivel frame 6 is swivellable about its axis in a pendulum fashion, with the conveying worms 3a, 3b laterally limiting the gap 4 striking along the inside of the container wall 5 radially limiting the gap 4 on the outside, so that the gap 4 is radially limited on the outside over the entire distance travelled by the swivel frame 6.

The two conveying worms 3a, 3b, extending along the entire length of the associated dirt removal container 1b, may be arranged with their ends on the end shields 9 of the swivel frame 6. In the example illustrated, the distance of the end shields 9 smaller than the length of the conveying worms 3a, 3b. Owing to a shortened support of the conveying worms 3a, 3b with regard to their entire length, a bending through of the conveying worms 3a, 3b can thus be prevented. In the example illustrated according to FIG. 2, provision is made for an end shield 9 in the region of the rear end of the dirt removal container 1b. The other end shield 9 is disposed at a distance from the opposite end of the dirt removal container 1b. The distance may be about ¼ of the worm length. Correspondingly, the distance between the two end shields 9 is ¾ of the worm length, so that the two conveying worms 3a, 3b are supported on one end and on ¾ of their length.

Both conveying worms 3a, 3b normally run synchronically. It would thus be conceivable to provide both conveying worms with two spur wheels in mutual engagement and to drive only one conveying worm actively. In the example illustrated, both conveying worms 3a, 3b are, as already stated above, individually drivable and for this purpose connected with an associated drive motor 10, preferably in the form of a hydraulic motor. The latter may be associated with the worm end arranged on the rear end shield 9. As both conveying worms 3a, 3b are drivable individually, it is also possible in special cases, as for example to remove clogging, to drive the conveying worms 3a, 3b at different speeds and/or in rotational directions not being engaged.

During operation, however, it may occur that the bulk material taken up and transported by the front conveying worm in the swivel direction of the swivel frame 6, in particular during an upward swivel movement of the swivel frame 6 falls through the gap formed by the subsequent volutions. The material reaching the gap 4 is taken up by the subsequent conveying worm and retained in the said gap 4 where it is transported forward by the effect of both conveying worms.

The material transported forward by the two conveying worms 3a, 3b in their longitudinal directions is discharged at the front worm end in transport direction, that is to say at the rear end of the dirt removal container 1b. In order to facilitate the onward transport and the discharge of the waste material transported by the conveying worms 3a, 3b, at least that one of the two expediently board shaped end shields 9, receiving the two conveying worms 3a, 3b, which faces the rear end of the dirt removal container 1b is provided with a gate shaped section 11 associated with the gap 4 and indicated in FIG. 1 which is open on the rim facing the inner side of the container wall 5 of the end shield 9. In the example illustrated, with a reduced distance of the two end shields 9 relative to the worm length both end shields 9 are expediently provided with a gate shaped section 11 of the kind described above.

In the example illustrated, the dirt removal container 1b is provided with and opening 12 on its rear end extending over its entire cross section, with a swivellable cover 13 being associated with the said opening which can be opened and closed by it. The bulk material transported by the conveying worms 3a, 3b is thus ejected from the sludge removal container 1b via the opening 12. In order to ensure a certain canalization of the bulk material ejected rearward, provision is made for a tipping shield 14 extending underneath the opening 12 of the sludge removal container 1b and laterally flanking it, as indicated in the example. The said tipping shield may expediently be designed as a slide having a rearward inclination. In order to support the effect of the said slide, the barrel 1 containing the sludge removal container 1 may be swivel-mounted on its rear end and raiseable to a certain extent in the region of its front end by means of an associated lifting unit.

With the aid of the tipping shield 14, the discharged bulk material may simply be ejected on a designated storage area or into a container placed underneath. In the example illustrated, the bulk material discharged by the conveying worms 3a, 3b from the dirt removal container 1b rearward is transported laterally, i.e., transversely to the container longitudinal direction by a discharge worm arrangement 15 subsequently arranged to the conveying worms 3a, 3b and extending transversely thereto, so that it can be ejected onto a storage area or container arranged beside the sludge removal container 1b and/or beside the vehicle receiving the latter.

The discharge worm arrangement 15 comprises a trough 17 associated with a discharge worm 16 having an outlet and/or leading to an outlet which in the example illustrated is suppliable with the bulk material discharged rearward by means of the tipping shield 14, that is to say, which is associated with and/or arranged subsequently to the tipping shield. In order to prevent the bulk material supplied to the trough 17 from falling beyond the lateral wall of the trough 17 away from the tipping shield 14 and correspondingly from the end of the conveying worms 3a, 3b adjacent to the trough 17, the lateral wall is associated with a foldable, board shaped protection shield 18 by which the height of the said lateral wall can be increased. The lateral wall 18 expediently extends over the width of the rear opening 12 of the sludge removal container 1b.

In the example illustrated, the discharge worm arrangement 15 possesses two sections, each containing one section of the conveying worm 16 and one section of the trough 17, that is to say, a first section slightly extending beyond the width of the dirt removal container 1b and/or its opening 12, but not extending beyond the width of the section 15b projecting above the vehicle receiving the said dirt removal container 1b, and further a second section 15b, swivel-mounted thereon, which can be swiveled up from a work position underlying FIG. 1, following the first section, to an upright drive position, as indicated in FIG. 1 by a swivel arrow. It is thus possible to place the discharged bulk material at a large distance beside the dirt removal container 1b and/or beside the vehicle receiving the latter and/or drop the bulk material into a container placed beside the sludge removal container 1b and/or the vehicle receiving the latter, which ensures good use of space.

The discharge worm arrangement sections of the two sections of the dirt removal container 15 may be associated with separate drive motors. In the example illustrated, provision is made for a joint drive motor 19 which is expediently designed as a hydraulic motor, provided in the region of the end of the discharge worm arrangement 15 away from the swivellable section 15b. The two worm sections can thus easily be coupled by coupling claws 20 (claw clutch) which are disengaged when section 15b is folded up and are brought into mutual engagement when section 15b is folded down.

It is understood that the foregoing description is that of the exemplary embodiments of the invention and that various changes and modifications may be made thereto without departing from the spirit and scope of the invention as defined in the appended claims.

What is claimed is:

1. A sewer cleaning device and/or street cleaning device comprising:
   at least one barrel shaped dirt removal container for receiving and transporting mineral dirt residues accumulating during sewer and/or street cleaning with a removal device being provided for clearing out the dirt removal container and associated with the latter;
   the dirt removal container being provided with a conveying worm arrangement extending in a longitudinal direction of the dirt removal container and with a rotary drive device;
   the conveying worm arrangement being received on a swivel frame;
   the swivel frame being swivel-mounted on an axis extending in a longitudinal direction of the container and swivellable by a swivel drive;
   the conveying worm arrangement being sideways deflectable by the swivel frame relative to a center position associated with the container bottom on both sides along the container wall;
   the conveying worm arrangement of the dirt removal device being provided with two conveying worms arranged parallel to each other in symmetrical position relative to a central longitudinal axis of the swivel frame received thereon;
   the conveying worms limiting a gap therebetween and acting together for the transport of the bulk material along the inner side of the container wall forming the radially inner limitation of the gap;
   the swivel frame receiving the two conveying worms and including two parallel end shields spaced from each other in the longitudinal direction of the conveying worms, swivellable about the central longitudinal axis of the dirt removal container;
   the end shields having a form broadening towards the container wall;
   the two conveying worms being arranged on the end shields at a distance forming the gap, with at least an end shield facing the rear end of the dirt removal container including a gate shaped section associated with the gap; and the gate shaped section being open on a rim facing the inner side of the container wall.

2. The sewer cleaning device and/or street cleaning device of claim 1, wherein the two conveying worms are spiralled in opposite directions and drivable in opposite directions facing each other in the region of the container wall.

3. The sewer cleaning device and/or street cleaning device of claim 1, wherein the two conveying worms are individually drivable by one associated drive motor.

4. The sewer cleaning device and/or street cleaning device of claim 1, wherein the swivel frame receiving the conveying worms is configured to be deflectable relative to its center position by an angle which is smaller than 90 degrees.

5. The sewer cleaning device and/or street cleaning device of claim 3, wherein the associated drive motor is a hydraulic motor.

6. The sewer cleaning device and/or street cleaning device of claim 1, wherein:
   the distance between the two end shields is smaller than the length of the conveying worms arranged thereon, and
   one end shield is arranged in the region of a rear opening of the dirt removal container.

7. The sewer cleaning device and/or street cleaning device of claim 1, wherein:
   the dirt removal container in the region of its rear end includes an opening and a swivel cover, and
   the opening is closed by the swivel cover and associated with a tipping shield.

8. The sewer cleaning device and/or street cleaning device of claim 1, wherein:
   downstream of the conveying worms, a discharge worm arrangement is arranged transversely to the conveying worms behind the dirt removal container, and
   the discharge worm arrangement includes a discharge worm configured to move in a trough adjacent to the opening of the sludge removal container.

9. The sewer cleaning device and/or street cleaning device of claim 8, wherein the discharge worm arrangement arranged transversely to the conveying worms is subdividable along its length and includes an extension section which is raiseable from a lying work position to an upright drive position and which laterally protrudes sideways over the dirt removal container in the work position.

10. The sewer cleaning device and/or street cleaning device of claim 9, wherein both worm sections of the discharge worm arrangement are drivable by a common drive motor and are coupled with each other by a claw clutch which is engaged and disengaged by the swivel movement of the extension section.

11. The sewer cleaning device and/or street cleaning device of claim 8, wherein:
   the trough includes a foldable protection shield provided on a lateral wall of the trough and facing away from the dirt removal container, and
   the foldable protection shield is configured to increase a height of the lateral wall of the trough.

12. The sewer cleaning device and/or street cleaning device of claim 8, wherein the trough is suppliable by the tipping shield and includes an outlet.

13. The sewer cleaning device and/or street cleaning device of claim 1, wherein the swivel frame receiving the conveying worms is deflectable relative to its center position by an angle which is approximately one half of the angular offset of the two conveying worms on the swivel frame and smaller than 90 degrees.

14. The sewer cleaning device and/or street cleaning device of claim 1, wherein the tipping shield is a slide arranged underneath the container end and is laterally flanking the container end.

\* \* \* \* \*

UNITED STATES PATENT AND TRADEMARK OFFICE
CERTIFICATE OF CORRECTION

PATENT NO. : 10,118,768 B2  
APPLICATION NO. : 15/838795  
DATED : November 6, 2018  
INVENTOR(S) : Wiedemann Page 1 of 1

It is certified that error appears in the above-identified patent and that said Letters Patent is hereby corrected as shown below:

On the Title Page

Item (56), change "DE 88 458 A 3/1972" to "DD 88 458 A 3/1972"

Signed and Sealed this  
Fifth Day of February, 2019

Andrei Iancu  
*Director of the United States Patent and Trademark Office*